No. 679,935. Patented Aug. 6, 1901.
G. BEHLER.
NUT LOCK.
(Application filed June 7, 1901.)
(No Model.)
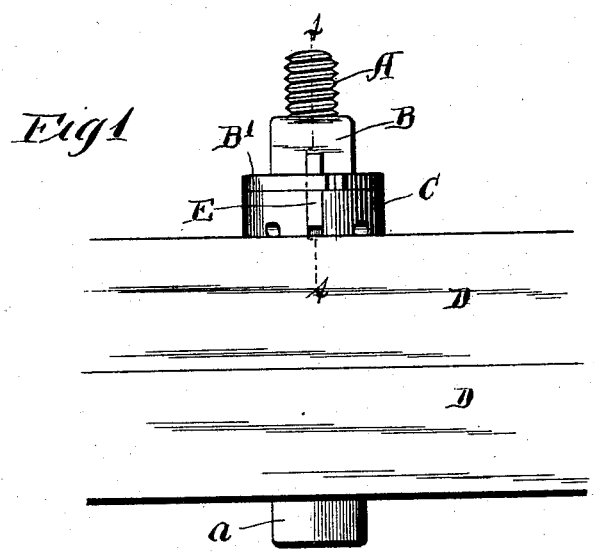
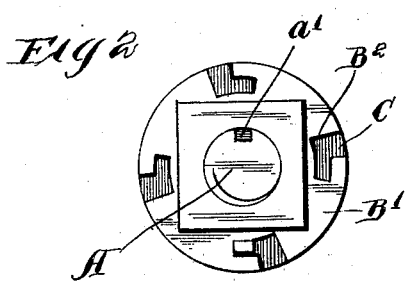
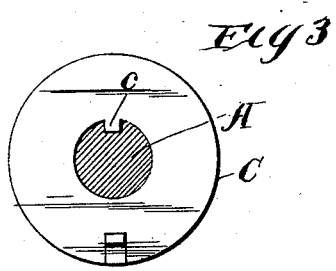
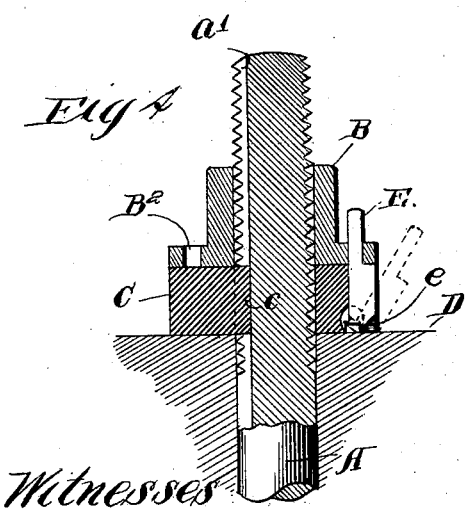
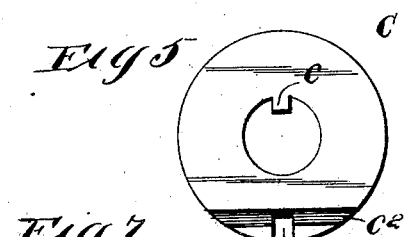
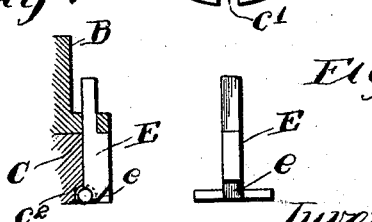
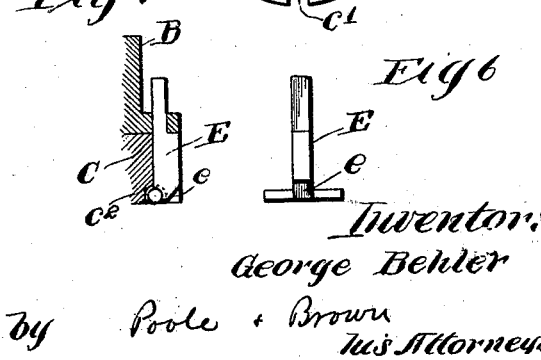
Witnesses
Carl H. Crawford
William L. Hall
Inventor:
George Behler
by Poole + Brown
his Attorneys

UNITED STATES PATENT OFFICE.

GEORGE BEHLER, OF THREEOAKS, MICHIGAN.

NUT-LOCK.

SPECIFICATION forming part of Letters Patent No. 679,935, dated August 6, 1901.

Application filed June 7, 1901. Serial No. 63,499. (No model.)

*To all whom it may concern:*

Be it known that I, GEORGE BEHLER, of Threeoaks, in the county of Berrien and State of Michigan, have invented certain new and useful Improvements in Nut-Locks; and I do hereby declare that the following is a full, clear, and exact description thereof, reference being had to the accompanying drawings, and to the letters of reference marked thereon, which form a part of this specification.

This invention relates to an improved nut-lock for bolts; and the invention consists in the matters hereinafter set forth, and more particularly pointed out in the appended claims.

In the drawings, Figure 1 is a side view of two parts joined by a bolt and a nut and provided with a nut-lock embodying my invention. Fig. 2 is a top plan view of the bolt and nut and the parts constituting the lock. Fig. 3 is a top plan view of the parts with the nut removed. Fig. 4 is a longitudinal axial section of a fragment of the bolt, nut, and washer on line 4 4 of Fig. 1. Fig. 5 is a bottom plan view of the washer. Fig. 6 is a side elevation of the locking-key removed from the washer. Fig. 7 is a detail section showing a modified form of the washer.

As shown in said drawings, A designates a bolt provided with a head $a$, and B designates a nut which has screw-threaded engagement with the screw-threaded end of said bolt. Said nut is provided on its inner end with a radial annular flange B', disposed in a plane perpendicular to the central axis of the nut.

C designates a cylindric washer interposed between said flanged nut and one of the parts D D, through which the bolt is passed and which are joined by said bolt. The flange B' fits flat against the outer face of the washer. Said washer C is non-rotatively mounted on the bolt, and for this purpose the washer is shown as provided with a lug $c$, which projects into the bore of said washer and is adapted for engagement with a longitudinal groove $a'$ in the bolt.

The flange B' of the nut is provided on its periphery with a plurality of outwardly-opening locking-notches $B^2$ of general L shape, or, in other words, having the form of the notch of a bayonet-joint. The outer or open part of each of said notches extends radially toward the center of the nut, and the inner part thereof is curved concentrically with respect to the central axis of the nut.

E designates a locking-key which is detachably connected with the washer C and is adapted for interlocking connection with the locking-notches of the nut B. Said key occupies an outwardly-opening groove $e'$ in the periphery of the washer and is hinged at its inner end to the washer in such manner that its outer end may be swung toward and away from said groove and the locking-notches of the flanged nut. For this purpose said key is shown as provided at its lower end with oppositely-extending trunnions E', which engage a downwardly-opening groove $c^2$ in the inner face of the washer C, said groove extending past the groove $c'$ at both sides thereof and intersecting said peripheral groove $c'$. As shown in Figs. 1 and 4, the groove $c^2$ and the trunnions E of the key are so formed that the trunnions can be inserted in said groove only when the key is occupying a horizontal position. For this purpose the lower margins of the groove $c^2$ are made to approach each other and the trunnions E' are made of greater width than depth, as clearly shown in Fig. 4. If desired, the groove $c^2$ may be so formed that the trunnions may enter the same in any position of the key, as shown in Fig. 7. The construction shown in Fig. 4 is preferred, as it provides a more certain connection between the key and washer when the bolt is detached from the parts which it is adapted to join. The key E is provided at its inner end adjacent to the pivot-trunnions and on the outer face thereof with an inclined part $e$, which permits the key to be swung outwardly away from the groove $c'$ after the washer has been brought into contact with one of the pieces D, through which the bolt passes.

The use of the device constructed as described is as follows: After the bolt has been inserted in place the washer C is slipped over the bolt, with the lug $c$ occupying the groove $a'$ in the bolt. Before the washer is brought into contact with the adjacent part D the key E is inserted into the groove $c'$ in the washer. If the washer be made like that shown in Fig. 4, said key is inserted into said groove by turning the key down horizontally into position for the trunnions E' to enter the pivot-groove $c^2$. If the pivot-groove $c^2$ of the washer be made as shown in Fig. 7, the key may be set in place by inserting it longitudinally into the groove $c'$ from the inner side of the washer before the washer is placed on the bolt. After said key has been inserted in said groove in either of the manners described and before the nut is turned downwardly into its final position said key is swung outwardly into the position indicated in dotted lines in Fig. 4 to permit the nut to be turned down upon the washer, the inclined part $e$ of said key permitting this movement. The nut is thereafter turned down tightly on the washer, with the outer part of one of the locking-notches $B^2$ located in line with the groove $c'$ in the washer. Thereafter the key is swung upwardly parallel with the axis of the washer, (shown in Fig. 4,) the outer end of the key entering the outer or radial part of the notch and in line with the inner curved part thereof. The nut is then turned backwardly, or in a direction to bring the inner curved part of the locking-notch over the outer end of the locking-key. Said inner curved part of the locking-notch is so disposed with respect to the screw-thread on the bolt that in order to turn the nut to bring the same into its final position with respect to the key after the key has been swung upwardly into the outer radial part of the notch the nut is rotated backwardly, or in a direction to turn it off the bolt. Consequently in order to rotate the nut in a direction to release the same from the inner or curved part of the locking-notch said nut must be rotated in a direction to tighten the same on the bolt. Obviously this action will not accidentally occur in the general use of the bolt, as the tendency of the nut is to turn off the bolt, and this direction of rotation is prevented by engagement of the locking-key with the inner or closed end of the curved part of the locking-notch. It will thus be seen that the nut is effectively locked from accidental rotation in a direction to remove the same from the bolt. When it is desired to remove the nut, it is turned by a suitable implement in a direction to bring the radial part of the locking-notch in line with the outer end of the key, after which the key is swung outwardly into the position indicated in dotted lines in Fig. 4, at which time the nut is free to be turned off the bolt. In practice the part of the locking-key occupying the groove $c'$ will be made of sufficient depth to fill said groove the entire depth thereof, and the outer surface of such key is rounded to correspond with the periphery of the washer. Obviously a greater or less number of the locking-notches $B^2$ may be provided, as best practice may dictate. It is furthermore obvious that the same general results would be secured if the locking-notches be formed in the periphery of the nut instead of a flange thereon. Other changes may be made in the details of construction without departing from the spirit of the invention, and I do not wish to be limited to such details, except as hereinafter made the subject of specific claims.

I claim as my invention—

1. The combination with a bolt and a nut, of a non-rotative washer on the bolt, said nut being provided with a plurality of outwardly-opening L-shaped notches, the inner parts of which are curved concentrically with respect to the axis of the nut, and a key on the washer, the outer end of which is adapted for engagement with said notches, said key being pivoted at its inner end to swing toward and away from the nut.

2. The combination with a bolt and a nut, of a non-rotative washer on the bolt, said nut being provided with a plurality of outwardly-opening L-shaped notches, the inner parts of which are curved concentrically with respect to the axis of the nut, and a key on the washer, the outer end of which is adapted for engagement with said notches, said washer being provided with a peripheral groove occupied by said key, said key being pivoted at its inner end in a manner permitting the same to swing into and out of the groove and the outer end thereof to swing toward and away from the nut.

3. The combination with a bolt and a nut, of a non-rotative washer on the bolt, said nut being provided with a plurality of outwardly-opening L-shaped notches the inner parts of which are curved concentrically with respect to the axis of the nut, and a key on the washer, the outer end of which is adapted for engagement with said notches, said washer being provided with a peripheral groove which receives the body of the key, and on its inner face with a transverse groove intersecting said peripheral groove, and the key being provided at its inner end with oppositely-extended trunnions which engage said transverse groove whereby the outer end of the key may be swung into and out of said peripheral groove and toward and away from the nut.

4. The combination with a bolt and a nut, of a non-rotative washer on the bolt, said nut being provided with a plurality of outwardly-opening L-shaped grooves, the inner parts of which are curved concentrically with respect to the axis of the nut, and a key on the washer the outer end of which is adapted for engagement with said notches, said washer being provided with a peripheral groove which receives the body of the key and on its inner face with a transverse groove intersecting said peripheral groove, and the key being provided with oppositely-extended trunnions which engage said transverse groove, whereby the outer end of the key may be swung into and out of the peripheral groove and toward and away from the nut, said trunnions being formed to permit the same to be engaged with and disengaged from said transverse groove in one position only of the key.

5. The combination with a bolt and a nut, of a non-rotative washer on the bolt, said nut being provided at its inner end with a radial annular flange which latter is provided with outwardly-opening L-shaped notches, the inner parts of which are curved concentrically with respect to the axis of the nut, and a key on the washer the outer end of which is adapted for engagement with said notch, said key being pivoted at its inner end to swing toward and away from the nut.

6. The combination with a bolt and a nut, of a non-rotative washer on the bolt, said nut being provided with outwardly-opening L-shaped notches, the inner parts of which are curved concentrically with respect to the axis of the nut, and a key on the washer, the outer end of which is adapted for engagement with said notches, said washer being provided on its periphery with a groove which receives the body of the key and the key being pivoted at its inner end to the washer in a manner permitting the outer end thereof to swing into and out of the groove and toward and away from the nut, the outer surface of the key at the inner end thereof being inclined to permit the key to swing away from the nut when the washer is in contact with a part through which the bolt passes.

7. The combination with a bolt and a nut, of a non-rotative washer on the bolt, said nut being provided with outwardly-opening L-shaped notches, the inner parts of which are curved concentrically with respect to the axis of the nut, and a key on the washer the outer end of which is adapted for engagement with said notches, said washer being provided in its periphery with a groove which receives the body of the key, and the key being pivoted at its inner end to the washer in a manner to swing toward and away from the nut, and being made of such depth as to entirely fill the groove, the outer surface of said key being flush with the periphery of the washer.

In testimony that I claim the foregoing as my invention I affix my signature, in presence of two witnesses, this 3d day of June, A. D. 1901.

GEORGE BEHLER.

Witnesses:
  H. E. SHEELEY,
  W. SCHMIDT.